(12) United States Patent
Basu Mallick et al.

(10) Patent No.: US 11,924,856 B2
(45) Date of Patent: *Mar. 5, 2024

(54) SYSTEM INFORMATION SCHEDULING IN MACHINE TYPE COMMUNICATION

(71) Applicant: Panasonic Intellectual Property Corporation of America, Torrance, CA (US)

(72) Inventors: Prateek Basu Mallick, Hessen (DE); Hidetoshi Suzuki, Kanagawa (JP); Joachim Loehr, Hessen (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/159,575

(22) Filed: Jan. 25, 2023

(65) Prior Publication Data

US 2023/0164812 A1    May 25, 2023

Related U.S. Application Data

(63) Continuation of application No. 17/315,054, filed on May 7, 2021, now Pat. No. 11,595,945, which is a (Continued)

(30) Foreign Application Priority Data

Apr. 10, 2015  (EP) .................................... 15163262

(51) Int. Cl.
*H04W 72/30* (2023.01)
*H04W 4/70* (2018.01)
(Continued)

(52) U.S. Cl.
CPC ............. *H04W 72/30* (2023.01); *H04W 4/70* (2018.02); *H04W 48/12* (2013.01); *H04W 72/0446* (2013.01); *H04W 72/12* (2013.01)

(58) Field of Classification Search
CPC ..... H04W 4/70; H04W 48/12; H04W 72/005; H04W 72/0446; H04W 72/12
See application file for complete search history.

(56) References Cited

U.S. PATENT DOCUMENTS

| 8,982,872 B2 | 3/2015 | Gou et al. |
| 10,555,244 B2 | 2/2020 | Lee et al. |

(Continued)

FOREIGN PATENT DOCUMENTS

| CA | 2767214 A1 | 1/2011 |
| CN | 101534473 A | 9/2009 |

(Continued)

OTHER PUBLICATIONS

3GPP TR 36.888, V12.0.0, "3rd Generation Partnership Project; Technical Specification Group Radio Access Network; Study on provision of low-cost Machine-Type Communications (MTC) User Equipments (UEs) based on LTE (Release 12)", Jun. 2013.
(Continued)

*Primary Examiner* — Brian P Cox
(74) *Attorney, Agent, or Firm* — Seed IP Law Group LLP

(57) ABSTRACT

The present disclosure relates to an apparatus for receiving system information in a wireless communication system including a receiver that receives system information configuration information and receives system information in predetermined subframes of a radio interface, and a controller that determines the predetermined subframes according to the received system information configuration information and controls the receiver to receive the system information in the predetermined subframes, wherein the system
(Continued)

information configuration information includes a subframe scheduling field with a plurality of bits, each bit being associated with a subframe and representing whether or not system information is to be received in that subframe. The present disclosure further relates to a corresponding apparatus for transmitting system information and to the respective receiving and transmitting methods.

9 Claims, 9 Drawing Sheets

Related U.S. Application Data continuation of application No. 16/676,901, filed on Nov. 7, 2019, now Pat. No. 11,032,798, which is a continuation of application No. 15/647,141, filed on Jul. 11, 2017, now Pat. No. 10,517,069, which is a continuation of application No. PCT/JP2016/001337, filed on Mar. 10, 2016.

(51) Int. Cl.
H04W 48/12 (2009.01)
H04W 72/0446 (2023.01)
H04W 72/12 (2023.01)

(56) References Cited

U.S. PATENT DOCUMENTS

| | | |
|---|---|---|
| 2009/0262693 A1 | 10/2009 | Wang et al. |
| 2011/0013554 A1 | 1/2011 | Koskinen |
| 2012/0039236 A1 | 2/2012 | Lv |
| 2013/0242766 A1 | 9/2013 | Xu et al. |
| 2014/0133381 A1 | 5/2014 | Zhu et al. |
| 2015/0215903 A1 | 7/2015 | Zhao et al. |
| 2015/0271846 A1 | 9/2015 | Kowalski et al. |
| 2015/0341957 A1 | 11/2015 | Tang et al. |
| 2016/0174014 A1 | 6/2016 | You et al. |

FOREIGN PATENT DOCUMENTS

| | | |
|---|---|---|
| CN | 104349484 A | 2/2015 |
| EP | 2051410 A1 | 4/2009 |
| EP | 2262339 A1 | 12/2010 |
| EP | 2346218 A1 | 7/2011 |
| WO | WO 2011147237 A1 | 12/2011 |
| WO | WO 2014121461 A1 | 8/2014 |
| WO | WO 2016047729 A1 | 3/2016 |

OTHER PUBLICATIONS

3GPP TS 36.212 V12.4.0, "3rd Generation Partnership Project; Technical Specification Group Radio Access Network; Evolved Universal Terrestrial Radio Access (E-UTRA); Multiplexing and channel coding (Release 12)," Mar. 2015, 94 pages.
3GPP TS 36.321, V12.5.0, 3rd Generation Partnership Project; Technical Specification Group Radio Access Network; Evolved Universal Terrestrial Radio Access (E-UTRA); Medium Access Control (MAC) protocol specification (Release12), Mar. 2015.
3GPP TS 36.331, V12.5.0, "3rd Generation Partnership Project; Technical Specification Group Radio Access Network; Evolved Universal Terrestrial Radio Access (E-UTRA); Radio Resource Control (RRC); Protocol specification (Release12)", Mar. 2015.
3GPP TSG RAN Meeting #66, RP-141865, "Revised WI: Further LTE Physical Layer Enhancements for MTC", Dec. 2, 2014.
3GPP TSG RAN Meeting #67, RP-150492, Ericsson, "Revised WI: Further LTE Physical Layer Enhancements for MTC", Mar. 2015.
3GPP TSG RAN WG1 Meeting #78, R1-143154, "D2D and cellular resource multiplexing", Aug. 2014.
3GPP TSG RAN WG1#66bis, R1-112912, Huawei, HiSilicon, CMCC: "Overview on low-cost MTC UEs based on LTE", Oct. 3, 2011.
3GPP TSG-RAN2 Meeting #89, R2-150515, "new SIB for eMTC", Feb. 2015.
Alcatel-Lucent, Alcatel-Lucent Shanghai Bell, "Considerations on bandwidth reduced operation for Rel-13 MTC UE," R1-144696, Agenda Item: 6.3.1.1.2, 3GPP TSG RAN WG1 Meeting #79, San Francisco, USA, Nov. 17-21, 2014, 3 pages.
English Translation of Chinese Search Report dated Jul. 30, 2019 for the related Chinese Patent Application No. 201680004000.6.
Ericsson, "Cleanup of references to 36.101," R2-091302, 3GPP TSG-RAN WG2 Meeting #65, Athens, Greece, Feb. 9-13, 2009, 6 pages.
Fujitsu, "System Information Considerations for Further LTE Physical Layer Enhancements for MTC," R2-150177, Agenda item: 7.4.2, 3GPP TSG-RAN WG2 Meeting#89, Athens, Greece, Feb. 9-13, 2015, 2 pages.
International Search Report of PCT application No. PCT/JP2016/001337 dated May 24, 2016.
NTT DoComo, Inc., "Text proposal for system information scheduling," R2-082824, Agenda item: 5.2.1.2, 3GPP TSG RAN WG2 #62, Kansas City, USA, May 5-9, 2008, 3 pages.
The Extended European Search Report dated Jan. 3, 2020 for the related European Patent Application No. 19212122.6.
Indian Examination Report dated Sep. 18, 2020 for the related Indian Patent Application No. 201747027095, 6 pages.

FIG. 6 radioframeAllocationPeriod (MP)   8
radioframeAllocationOffset (MO)   2
subframeAllocation (oneFrame)   110000

| SFN | SFN MOD MP | MO | MBSFN |
|---|---|---|---|
| 0 | 0 | 2 | X |
| 1 | 1 | 2 | X |
| 2 | 2 | 2 | O |
| 3 | 3 | 2 | X |
| 4 | 4 | 2 | X |
| 5 | 5 | 2 | X |
| 6 | 6 | 2 | X |
| 7 | 7 | 2 | X |
| 8 | 0 | 2 | X |
| 9 | 1 | 2 | X |
| 10 | 2 | 2 | O |
| 11 | 3 | 2 | X |
| 12 | 4 | 2 | X |
| 13 | 5 | 2 | X |
| 14 | 6 | 2 | X |
| 15 | 7 | 2 | X |
| 16 | 0 | 2 | X |
| 17 | 1 | 2 | X |
| 18 | 2 | 2 | O |
| 19 | 3 | 2 | X |

| SUBFRAME | MBSFN |
|---|---|
| 0 | N/A |
| 1 | 1 |
| 2 | 1 |
| 3 | 0 |
| 4 | N/A |
| 5 | N/A |
| 6 | 0 |
| 7 | 0 |
| 8 | 0 |
| 9 | N/A |

SYSTEM INFORMATION SCHEDULING IN MACHINE TYPE COMMUNICATION

BACKGROUND

Technical Field

The present disclosure relates to transmission and reception of system information in a wireless communication system.

Description of the Related Art

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g., parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

The reception of system information (SI) is an operation to be performed by a UE on the basis of a scanned RF signal and a detected synchronization signal. In particular, upon the detection of synchronization signals the UE is capable of identifying a cell and of synchronizing with downlink transmissions by the cell. Accordingly, the UE may receive a broadcast channel, BCH, of a cell, and, hence, the corresponding system information. On the basis thereof, the UE can detect whether or not a cell is suitable for selection and/or reselection, i.e., whether the cell is a candidate cell.

System information is information which is transmitted in a broadcast manner to all UEs in a cell. It includes information necessary for cell selection and some parts thereof are to be read at any cell selection/reselection, after the UE synchronizes with the cell.

System information is structured by means of System Information Blocks (SIBs), each of which includes a set of parameters. In particular, system information is transmitted in a Master Information Block, MIB, and a number of System Information Blocks. The MIB includes a limited number of the most essential and most frequently transmitted parameters that are needed to acquire other information from the cell such as the downlink system bandwidth, an indicator of the resources allocated to HARQ acknowledgement signaling in the downlink, and the System Frame Number (SFN). The remaining SIBs are numbered; there are SIBs 1 to 13 defined in Release 8.

SIB1 contains parameters needed to determine if a cell is suitable for cell selection, as well as information about the time domain scheduling of the other SIBs. SIB2 includes common and shared channel information. SIBs 3 to 8 include parameters used to control intra-frequency, inter-frequency and inter-Radio Access Technology (RAT) cell reselection. SIB9 is used to signal the name of a Home eNodeB, whereas SIBs 10 to 12 include the Earthquake and Tsunami Warning Service (ETWS) notifications and Commercial Mobile Alert System (CMAS) warning messages. Finally, SIB 13 includes MBMS related control information.

The system information is transmitted by the RRC protocol in three types of messages: the MIB message, the SIB1 message and the SI message. The MIB messages are carried on the Physical Broadcast Channel (PBCH) whereas the remaining SIB1 and SI messages are at the physical layer multiplexed with unicast data transmitted on the Physical Downlink Shared Channel (PDSCH).

The MIB is transmitted at a fixed cycles. The SIB1 is also transmitted at the fixed cycles. In order to improve robustness of the system information transmission, the system information is repeated. The repetitions have different redundancy versions and thus, they are not repetitions of the bits effectively transmitted but rather repetitions of the data carried but coded differently. For instance, MIB is transmitted every frame in the first subframe (subframe #0) wherein the new MIB (MIB with content possibly different from the previous MIBs) is transmitted every four frames and the remaining three frames carry its repetition. Similarly, repetition coding is applied for transmission of SIB 1. A new SIB1 is transmitted every 8 frames. Each SIB1 has three further repetitions.

All other SIBs are being transmitted at the cycles specified by SIB scheduling information elements in SIB1. In particular, the mapping of SIBs to a SI message is flexibly configurable by schedulingInfoList included in SIB1, with restrictions that each SIB is contained only in a single SI message, and at most once in that message. Only SIBs having the same scheduling requirement (periodicity) can be mapped to the same SI message; SIB2 is always mapped to the SI message that corresponds to the first entry in the list of SI messages in the schedulingInfoList. There may be multiple SI messages transmitted with the same periodicity.

Thus, a terminal determines the SI-window based on the signaled information and starts receiving (blind decoding) of the downlink shared channel using the SI-RNTI (an identifier meaning that signaling information is transmitted) from the start of the SI-window and continue for each subframe until the end of the SI-window or until the SI message was received, excluding the subframe #5 in radio frames for which SFN mod 2=0, any MBSFN subframes, and any uplink subframes in TDD. If the SI message was not received by the end of the SI-window, the reception is repeated at the next SI-window occasion for the concerned SI message.

In other words, during blind decoding, the UE tries to decode PDCCH on each subframe of an SI-window by using the SI-RNTI but only some of these subframes really carry PDCCH (CRC) encoded using the SI-RNTI (corresponding to PDSCH containing the particular SI).

For further details on the definition of system information, see for example 3GPP, TS 36.331, V12.5.0, "3rd Generation Partnership Project; Technical Specification Group Radio Access Network; Evolved Universal Terrestrial Radio Access (E-UTRA); Radio Resource Control (RRC); Protocol specification (Release 12)", sections 6.2.2.7 and 6.3.1, available at http://www.3gpp.org and incorporated herein by reference.

As LTE deployments evolve, operators strive to reduce the cost of overall network maintenance by minimizing the number of RATs. In this respect, Machine-Type Communications (MTC) devices is a market that is likely to continue expanding in the future.

Many MTC devices are targeting low-end (low cost, low data rate) applications that can be handled adequately by GSM/GPRS. Owing to the low cost of these devices and good coverage of GSM/GPRS, there is very little motivation for MTC device suppliers to use modules supporting the LTE radio interface.

As more and more MTC devices are deployed in the field, this naturally increases the reliance on GSM/GPRS networks. This will cost operators not only in terms of maintaining multiple RATs, but also prevent operators reaping the maximum benefit out of their spectrum (given the non-optimal spectrum efficiency of GSM/GPRS). With users and traffic becoming denser, using more spectral-efficient technologies, such as Long Term Evolution (LTE), allow the operators to utilize their spectrum in a much more efficient way.

Given the likely high number of MTC devices, the overall resource they will need for service provision may be correspondingly significant, and inefficiently assigned (for further details on objectives for MTC, see for example 3GPP, RP-150492 Ericsson: "Revised WI: Further LTE Physical Layer Enhancements for MTC", section 4, available at http://www.3gpp.org and incorporated herein by reference).

Approaches to lower the cost of LTE presently regard the volume of products as the primary reason. The impact of volume can be seen in two possible ways, depending on how low-cost MTC is developed. Firstly, if low-cost MTC may be very similar to mainline LTE and included in LTE chipsets, MTC has the benefit of the volume of LTE. Secondly, a low-cost MTC based on LTE may have significantly lower cost than mainline LTE. Although it appears not to have the volume benefit of LTE, the volume of MTC devices can be even larger due to a potentially greater number of supported MTC applications and scenarios.

In this respect, the following approaches to lower the cost of LTE, i.e., defining low-cost MTC are discussed and found to have significant UE cost impact (for further details on low-cost MTC devices, see for example 3GPP, R1-112912, Huawei, HiSilicon, CMCC: "Overview on low-cost MTC UEs based on LTE", section 4, available at http://www.3gpp.org and incorporated herein by reference):

Reduction in supported bandwidth for the low-cost LTE: The low cost of 1.4 MHz (6 RB) downlink bandwidth could cover most application scenarios of MTC. However, 3 MHz (15 RB) or 5 MHz (25 RB) could be considered given that the complexity does not increase much. Given that the uplink may have a larger requirement for MTC services, the possibility of reduced transmit power, and small baseband complexity (relative to downlink reception), any reduction in minimum transmission bandwidth in the UE should be carefully justified.

Modified PDCCH-related design for the low-cost LTE to simplify the PDCCH blind decoding and give efficient channel access for a large number of MTC devices. A reduction in maximum bandwidth (e.g., 1.4 MHz) decreases PDCCH blind decoding naturally.

Protocol simplification including HARQ consideration, MAC, RLC and RRC protocol. Signaling reduction between low duty cycle MTC devices and the base station.

Transmission modes down-selection to maintain coverage and balance complexity.

Further considerations on low-cost MTC devices relate to an improved indoor coverage. A number of applications require indoor deployment of Machine Type Communication, MTC, devices, e.g., in an apartment basement, or on indoor equipment that may be close to the ground floor etc. These UEs would experience significantly greater penetration losses on the radio interface than normal LTE devices. This effectively means that indoor coverage should be readily available and reliable: i.e., should provide a significant improvement on existing coverage.

Additionally, regarding the power consumption of low-cost MTC devices it is noted that many applications require devices to have up to ten years of battery life. In this respect, presently available Power Save Modes appear not sufficient to achieve the envisaged battery life. In this respect, it is anticipated that further techniques are proposed to significantly cut down the power usage of MTC devices e.g., by optimizing signaling exchanges in the system, in order to realize battery life of up to ten years.

For improving indoor coverage (for low-cost MTC devices), recent developments have focused on an Enhanced Coverage, EC, mode that is applicable to UEs e.g., operating delay tolerant MTC applications. Another term is "Coverage Extension".

The corresponding Work Item in 3GPP Release 12 "Low cost & enhanced coverage MTC UE for LTE" came to the conclusion that further complexity reduction of LTE devices for MTC can be achieved if additional complexity reduction techniques are supported, as apparent from the technical report TR 36.888, v12.0.0, "Machine-Type Communications (MTC) User Equipments (UEs)", available at www.3gpp.org and incorporated herein by reference. The technical report TR 36.888 concluded that a coverage improvement target of 15-20 dB for both FDD and TDD in comparison to a normal LTE footprint could be achieved to support the use cases where MTC devices are deployed in challenging locations, e.g., deep inside buildings, and to compensate for gain loss caused by complexity-reduction techniques. MTC coverage enhancements are now expected to be introduced in 3GPP Release 13.

In general, the MTC devices may be low complexity (LC) MTC devices (which basically forces the device to receive a TBS of 1000 bits or less as a result of buffer size limitations and other implementation limitations) or enhanced coverage (EC) devices which are supposed to support a large number of repetitions.

In other words, LC are Low Complexity devices which are meant to be inexpensive devices with limited buffer sizes/simple implementation etc. whereas the EC devices are the coverage enhanced device that should operate in challenging situations like in basement or far away from the cell center.

The general objective is to specify a new UE for MTC operation in LTE that allows for enhanced coverage and lower power consumption. Some of the additional objectives are given below:

Reduced UE bandwidth of 1.4 MHz in downlink and uplink.

Bandwidth reduced UEs should be able to operate within any system bandwidth.

Frequency multiplexing of bandwidth reduced UEs and non-MTC UEs should be supported.

The UE only needs to support 1.4 MHz RF bandwidth in downlink and uplink.

The allowed re-tuning time supported by specification (e.g., ~0 ms, 1 ms) should be determined by RAN4.

Reduced maximum transmit power.

The maximum transmit power of the new UE power class should be determined by RAN4 and should support an integrated PA implementation.

Reduced support for downlink transmission modes.

The following further UE processing relaxations can also be considered within this work item:

Reduced maximum transport block size for unicast and/or broadcast signaling.

Reduced support for simultaneous reception of multiple transmissions.

Relaxed transmit and/or receive EVM requirement including restricted modulation scheme. Reduced physical control channel processing (e.g., reduced number of blind decoding attempts).

Reduced physical data channel processing (e.g., relaxed downlink HARQ time line or reduced number of HARQ processes).

Reduced support for CQI/CSI reporting modes.

A relative LTE coverage improvement—corresponding to 15 dB for FDD—for the UE category/type defined above and other UEs operating delay-tolerant MTC applications with respect to their respective normal coverage shall be possible. At least some of the following techniques, which shall be applicable for both FDD and TDD, can be considered to achieve this:

Subframe bundling techniques with HARQ for physical data channels (e.g., PDSCH, PUSCH)

Elimination of use of control channels (e.g., PINCH, PDCCH) Repetition techniques for control channels (e.g., PBCH, PRACH, (E)PDCCH)

Either elimination or repetition techniques (e.g., PBCH, PHICH, PUCCH)

Uplink PSD boosting with smaller granularity than 1 PRB

Resource allocation using EPDCCH with cross-subframe scheduling and repetition (EPDCCH-less operation can also be considered)

New physical channel formats with repetition for SIB/RAR/Paging

A new SIB for bandwidth reduced and/or coverage enhanced UEs

Increased reference symbol density and frequency hopping techniques

Relaxed "probability of missed detection" for PRACH and initial UE system acquisition time for PSS/SSS/PBCH/SIBs can be considered as long as the UE power consumption impact can be kept on a reasonable level.

Spreading: Spreading refers to spreading of information across resources including time-frequency domain resources or even spreading using Scrambling (or Channelization) codes.

There can be also other techniques than those listed above.

The amount of coverage enhancement should be configurable per cell and/or per UE and/or per channel and/or group of channels, such that different levels of coverage enhancements exist. The different levels of coverage enhancement could mean different level of CE techniques being applied to support the CE-device transmission and reception.

Relevant UE measurements and reporting to support this functionality should be defined.

For more details, see for example 3GPP RP-141865 "Revised WI: Further LTE Physical Layer Enhancements for MTC" sourced by Ericsson, available at http://www.3gpp.org and incorporated herein by reference.

Notably, coverage enhancements of 15/20 dB for UEs in the Enhanced Coverage mode with respect to their nominal coverage means that the UEs have to be capable of receiving extremely low signal strengths. This applies not only to the initial scanning operation, the cell search and the cell selection operation but also the subsequent communication scheme to be performed by the UE. As described above, there will be different levels of CE depending on the network support and UE capability, e.g., 5/10/15 dB coverage extension.

Early attempts to define the Enhanced Coverage mode have focused on modifications of the radio transmissions. In this respect, discussions have focused on repeated transmissions as being the main technique to improve the coverage. Repetitions can be applied to every channel for coverage improvement.

An exemplary implementation of these repeated transmissions prescribes that the same data is transmitted across multiple sub-frames. Yet, it will become immediately apparent that these repeated transmissions will use more resources (time-frequency) than what is required for normal coverage UEs. RAN1 indicated that the transport block size used for transmission to the MTC devices will be less than 1000 bits.

The above requirements, a new information message scheduling will be necessary to minimize the system overheard as well as not to affect the system of previous releases and legacy UEs served thereby.

BRIEF SUMMARY

One non-limiting and exemplary embodiment provides apparatuses and methods for an efficient transmission and reception of system information in a wireless network.

In one general aspect, the techniques disclosed here feature an apparatus for receiving system information in a wireless communication system, including a receiver that receives system information configuration information and receives system information in predetermined subframes of a radio interface, and a controller that determines the predetermined subframes according to the received system information configuration information and controls the receiver to receive the system information in the predetermined subframes, wherein the system information configuration information includes a subframe scheduling field with a plurality of bits, each bit being associated with a subframe and representing whether or not system information is to be received in that subframe.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

FIG. 6 is a schematic drawing illustrating MBSFN sub-frame configuration;

DETAILED DESCRIPTION

Figure 1:
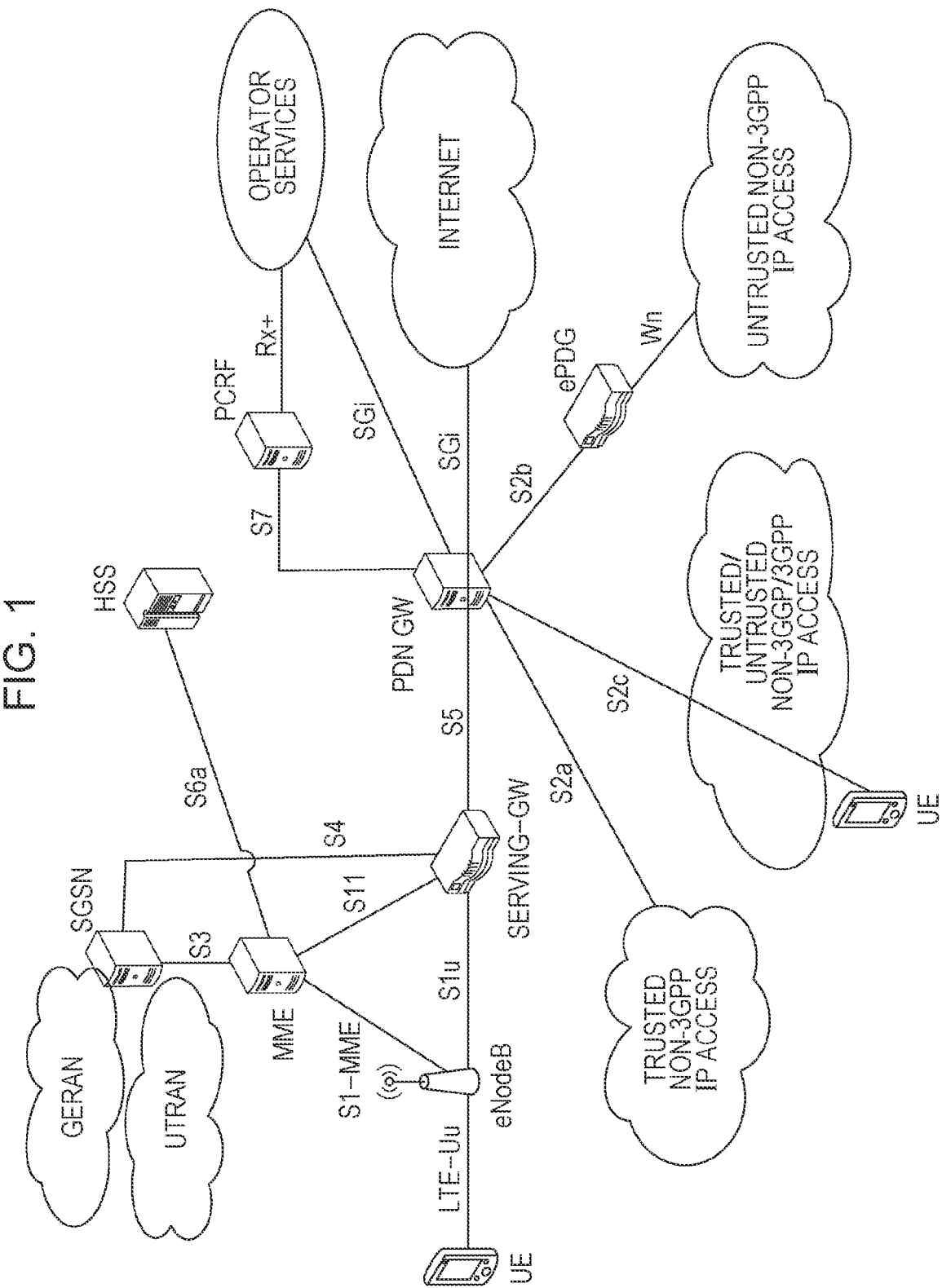
FIG. 1 is a block diagram illustrating current 3GPP architecture for machine type communication.

The present disclosure relates to transmission and reception of system information in a wireless communication system which is particularly suitable for transmission and reception of system information for machine type communication such as the MTC in the 3GPP LTE. The system information signaling has been recently discussed in 3GPP and the following aims have been preliminarily agreed on:

maintain the flexibility similar to the one offered by the current SIB concept, i.e., the size of the SIBs should not be fixed.

branch from SIB1, i.e., LC/EC UEs receive a separate occurrence of SIB1 and others (different time/frequency resources). The new SIB1 is common for EC and LC.

transmit SIB1 information separately from other SIBs (in particular to low cost UEs in normal coverage), if feasible in terms of overhead and total acquisition time.

the scheduling information (time, frequency and MCS/TBS) allowing acquiring SIB1 for LC/EC UEs could e.g., be carried in MIB, i.e., dynamic L1 information in PDCCH is not needed.

SIB1 for LC/EC UEs could contain scheduling information (time, frequency and MCS/TBS) allowing acquiring subsequent SIBs without reading PDCCH.

the TB size restriction of 1000 bit for broadcast may be acceptable, assuming that the network provides separate SIBs (different time/frequency resources) to LC/EC UEs and legacy UEs.

If the current mechanism for transmission of system information is applied for communication applying a large number of repetitions such as MTC communication, each of the SIBs currently used will be transmitted with approximately 50 times higher repetition rate. These would affect, for instance:

the acquisition time for the system information by the legacy UEs if the system information blocks do not overlap and thus, repetition of the system information would cause longer transmission delay of the system information block and therefore also increased the delay of the transmission of the next system information block, repeated transmissions of the entire system information would also lead to a huge system load, which may be unnecessary since the MTC devices does not make use of all information transmitted in the current system information signaling. Accordingly, the MTC UEs would receive irrelevant system information.

The reception of the entire system information that would increase power consumption in the MTC device.

Thus, the aim of the standardization that the SIB1 should contain scheduling information (such as time, frequency and modulation and coding scheme or transport block size) allowing the acquisition of subsequent SIBs without reading Physical Downlink Control Channel (PDCCH) is reasonable since reading PDCCH itself will need similar amount of time/battery and network resources. However, it is currently not clear, how this aim is to be achieved. In particular, the acquisition of system information (including one or more SIBS) without dynamic scheduling requires the MTC device to know that and where these SIBs are scheduled. Dynamic scheduling is implemented by means of blind decoding. In particular, a special identifier for the transmission of system information, SI-RNTI (SI Radio Network Temporary Identity) is provided. The devices monitor physical downlink shared channel (in particular, its control part PDCCH) for occurrence of this identifier and upon its detection, the devices read (decode) the corresponding system information (System Information format and syntax is specified in the 3GPP TS 36.331, (for instance, version 12.5.0), Section 5.2, whereas the physical layer aspects can be found in 3GPP TS 36.212, v12.4.0, Section 5.3.3, both specifications being available at www.3gpp.org).

The scheduling information can be provided to the wireless devices in a system specification (i.e., the scheduling information is statically provided in the specification). However, this approach does not provide any scheduling freedom which reduces the possibility of efficient and customized system information scheduling.

Alternatively, the scheduling information may be provided semi-statically, for instance in scheduling information such as the scheduling information currently transmitted within SIB 1. However, in this case it is unclear how the wireless MTC device uses this information in frames and subframes carrying e.g., multimedia broadcast single frequency network (MBSFN) communication.

In order to provide a solution for scheduling of system information, the MTC system information could be scheduled in any subframe using a corresponding special RNTI such as MTC-RNTI to indicate that the system information is designated to MTC devices. However, this solution will still require using of not physically broadcasted channels such as (e)PDCCH or MPDCCH ("e" standing for "enhanced" and "M" for MTC) channels and blind decoding thereof which still results to a high number of repetitions and delays in system information acquisition times for both Low Complexity, LC, MTC devices and enhanced coverage, EC, MTC devices because each LC and EC devices would still need to decode at least the portions of PDCCH for matching with the specialized identifier (SI-RNTI or MTC-RNTI, respectively).

In order to comply with some of the above aims and to provide efficient system information signaling, according to the present disclosure, the system information configuration information is transmitted by the network in order to indicate to wireless devices the location of the system information. The system information configuration information includes a plurality of bits, each bit being associated with a subframe and representing whether or not system information is transmitted in that subframe.

In an exemplary embodiment, a master information block (MIB) is transmitted (broadcasted) indicating the position of system information block (SIB1) for MTC including system information configuration information for MTC related system information. The SIB1 for MTC may be a SIB1 different from the SIB1s used for the legacy system information, which has the advantage of avoiding the MTC UEs receiving portions of SIB not relevant for their operation. However, the present disclosure is not limited thereby and, in general, the SIB1 may be common to both the legacy and the low complexity/enhanced coverage UEs including only specific information elements destined for the LC/EC UEs.

The system information (SI) configuration information includes a bitmap (subframe scheduling field), of which each bit indicates for one particular subframe whether or not system information is included therein. In this embodiment, the system information is system information for the both LC (Low Complexity) and EC (Enhanced Coverage) terminals. However, it is noted that the present disclosure is not limited to such deployment. Rather, the system information transmission and reception as described herein may also be applied for conveying system information for either the Low Complexity MTC devices, or only for the Enhanced Coverage MTC devices, in a wireless system as the only one approach for conveying the system information.

The bitmap is advantageously a field of bits which take value "0" for subframes in which no system information is transmitted and take value "1" for subframes in which the system information is transmitted. However, it is clear to those skilled in the art, the assignment of "0" and "1" may also be reversed without departing from the idea.

Figure 5A:
FIG. 5A is a schematic drawing illustrating association of a bitmap with system information scheduling.

For instance, the bitmap may include a separate bit for each and every subframe forming a part of the subframe configuration. In other words, assuming the number of 10 subframes within a radio frame as is the case for the LTE system, the bitmap has the length of 10 bits for the respective 10 subframes numbered from 0 to 9. However, the present disclosure is not limited thereto. Rather, in certain situations it may be beneficial for the efficiency reasons if the bitmap has less bits then the frame has subframes. For instance, in LTE as well as in LTE-A the first subframe (subframe with number 0) is never used for transmission of system information. Accordingly, in order to save resources, the bitmap may have length of 9 bits corresponding to respective subframes 1 to 9. Subframe 0 is used for transmission of a new MIB every fourth frame and for transmission of MIB repetitions in the remaining frames, i.e., for system information which is broadcasted. The repetitions are not bit-by-bit repetitions but rather different redundancy versions of the new MIB. No further SIBs are then mapped onto the same subframe. This is illustrated in FIG. 5A, in which four example frames each having 10 subframes are illustrated. Each frame has the first subframe dedicated to MIB. Subframes carrying the system information are marked by "x". The corresponding bitmaps are on the right-hand side: all bitmap have the size of nine bits. The subframe scheduling field may thus include a bitmap such as the examples shown above, having 9 bits. It is noted that the present disclosure is not limited to a bitmap having a number of bits reflecting (some of the) subframes of one single frame. Rather, the bitmap signaled as the subframe scheduling field may reflect a plurality of frames. This may make sense, if a SIB scheduling pattern follows a larger window repetition structure. For instance, the bitmap may represent 4 frames, i.e., include all four (in this context sub)-bitmaps shown in FIG.

5A and thus, may have a length of 4×9=36 bits. However, 4 is only an example and the number of frames may also differ without departing from the present disclosure.

Moreover, the bitmap may be (further) shortened by excluding subframes which are not to be used for carrying the system information. For instance, the bitmap may be shortened by excluding subframes including other system information. For instance, subframes scheduled (configured) for legacy coverage system information may be assumed not to carrying system information for enhanced coverage system (for instance MTC). In such case the bitmap size may be reduced by not including bits corresponding to subframes configured to carry system information of the co-existing system (system sharing resources). However, in order to achieve this, the position of subframes carrying such parallel system information has to be known to the terminal. This is possible if the scheduling information for the EC and the scheduling information for the LC are carried in the same MIB or SIB1. The EC terminals may also read SIB1 of the LC system in order to receive the scheduling information.

Figure 5B:
FIG. 5B is a schematic drawing illustrating association of a bitmap with system information scheduling.

FIG. 5B illustrates an example in which the bitmap size is reduced by excluding subframe carrying MIB as well as subframes carrying legacy coverage system information (marked as "o"). As can be seen on the right-hand side, the example bitmaps have different sizes. In particular, the first bitmap has a size of 7 bits corresponding to subframe numbers 2, 3, 4, 5, 7, 8, 9 and leaving out the subframes for MIB an LC Ms. The second bitmap has a size of 9 bits corresponding to subframe numbers 0, 1, 2, 3, 4, 5, 6, 8, 9 and leaving out subframe seven carrying LC SIBs. The third bitmap has a size of 10 bits since it does not carry either of MIB or LC Ms. The fourth bitmap has a size of eight, excluding two bits corresponding to subframes number 4 and 9 carrying LC Ms. It is noted that the above bitmaps are also mere examples. In general, for a system like LTE, in which MIB is transmitted or repeated in each frame, it makes sense to leave out the first subframe (and correspondingly each bit in the bitmap) of each frame. However, the present disclosure is not limited to LTE and to systems in which MIB is signaled in the first subframe. Thus, FIG. 5B also shows example bitmaps which do not include and/or leave out any MIB-subframe. As also described with respect to FIG. 5A, FIG. 5B also shows 4 examples, each of which illustrates a bitmap that may be transmitted as the scheduling subframe field-reflecting one single frame. The repetition and location of such frames may be determined by further scheduling parameters such as offset and repetition period.

However, the present disclosure also includes a scheduling subframe field representing subframes more than one frames, i.e., a bitmap with bits corresponding to subframes of more than one frame. For instance, first two frames of FIG. 5B may be represented by a bitmap with 7+9=16 bits corresponding to the first two bitmaps with 7 and 9 bits respectively.

The subframes in which the system information is transmitted may still be used also for unicast transmission of other data. In particular, in order to reduce overhead costs by scheduling of system information, it may be beneficial to predefine certain number of physical resource blocks as well as their position in the resource grid of a subframe used for system information if that subframe is configured to carry the system information. For example, in subframes configured to carry SI, central six physical resource blocks without applying frequency hopping may be used to carry the SI. This is only an example and alternatively the predefined location may include central six physical resource blocks with applying frequency hopping. However, other configurations are applicable including other amount of physical resource blocks and other than central location.

The present disclosure is not limited to this configuration, and in order to enable more flexibility in scheduling the system information, the frequency allocation may also be signaled within the SI configuration information. For instance, the number and/or location of the frequency resources may be signaled as well as whether or not frequency hopping is applied. Alternatively, the number N the location of the frequency resources may be known and the signaling may only include whether or not frequency hopping is applied. Still alternatively, the usage of frequency hopping may be predefined as well as the location of frequency resources for a particular amount of frequency resources, whereas the number of frequency resources is signaled. Other configurations of predefined and signaled scheduling information are possible.

For example, the frequency location and hopping information for scheduling MTC SIs (each SI containing one or more SIBs) is contained in a separate scheduling information block which may reside inside the SIB1 or even as a separate block scheduled from SIB1. Another possibility is to use the scheduling information (e.g., either/both frequency and time domain scheduling), or a derivation (e.g., an offset) thereof, used to schedule SIB1 (for MTC). In particular, SIB1 for MTC can be scheduled using MIB wherein some bits in MIB indicate a combination in MIB, the combination indicating possibilities of:

CE Support=Yes/No
Possible SIB1 (MTC) sizes=X/Y/Z bits
Possible subframes used to transmit SIB1 (MTC).

An example of such combinations is shown in the table below (using a 2 bit combination):

| Combination Index | Size of MTC SIB1 | Subframes used for MTC SIB1 |
|---|---|---|
| 00 | No CE Support | 0 |
| 01 | newSIB1-SizeXbits | Sf#4 |
| 10 | newSIB1-SizeYbits | Sf#4, 5 and 9 |
| 11 | newSIB1-SizeZbits | Sf# 3, 4, 6, 7, 8 and 9 |

In this table, the first column shows the bits indicating one of the 4 possible combinations. The second column shows size of the new SIB1 (i.e., SIB1 for the other system like MTC) and the third column shows the subframes of a frame possibly used to transmit the new SIB 1. The rows of the table thus show the respective possible configurations.

However, it is noted that there may be more than 4 possible combinations signaled, using more than 2 bits.

For instance, a higher bit combination such as a 5 bit combination in MIB could be used. Moreover, such combinations may also include other parameters than the SIB1 size and the subframes in which SIB1 is scheduled. Alternatively or in addition to these parameters, the combination may indicate frequency resources/hopping pattern etc. corresponding to each of the above combinations.

SIB1 may then carry the bitmap as described above indicating in which subframes further system information is carried. The bitmap already may leave out bits corresponding to subframes for SIB1 scheduling which are indicated, for instance, by the combination as exemplified in the table above.

Therefore, the derivation of SI resources may depend on (or be derived from) the MTC SIB1 scheduling which in turn is being scheduled from MIB. The derivation information (e.g., time/frequency offset) for SI resources could be signaled in MTC SIB1 itself Alternatively, or in addition, if there are subframes configured for multimedia broadcast such as MBSFN in LTE like systems, the system information will not be carried in such subframes. Correspondingly, the bitmap size may be reduced by not including bits corresponding to subframes configured for multimedia broadcast. It is noted that multimedia broadcast subframes may be excluded if their position is known from other signaling information.

MBSFN subframes are configured semi-statically in LTE, i.e., via RRC protocol. This configuration specifies how periodically the MBSFN subframes appear (e.g., every X frames) and where does the subframe mapping start from (offset).

In particular the physical layer scheduling of MBSFN subframes is specified in SIB2 within an information element (IE) mbsfn-SubframeConfigList, further including MBSFN-SubframeConfig IE which has the following format:

```
MBSFN-SubframeConfig ::=            SEQUENCE {
   radioframeAllocationPeriod ENUMERATED {n1, n2, n4, n8, n16, n32},
   radioframeAllocationOffset INTEGER (0..7),
   subframeAllocation CHOICE {
      oneFrame                     BIT STRING (SIZE(6)),
      fourFrames                   BIT STRING (SIZE(24))
   }
}
``` in which the IE fourFrames is a bit-map indicating MBSFN subframe allocation in four consecutive radio frames, "1" denotes that the corresponding subframe is allocated for MBSFN. The bitmap is interpreted as follows: In FDD: Starting from the first radio frame and from the first/leftmost bit in the bitmap, the allocation applies to subframes #1, #2, #3, #6, #7, and #8 in the sequence of the four radio-frames. In TDD: Starting from the first radio frame and from the first/leftmost bit in the bitmap, the allocation applies to subframes #3, #4, #7, #8, and #9 in the sequence of the four radio-frames. The last four bits are not used. Uplink subframes are not allocated. The subframes of a frame are numbered from #0 to #9.

In the IE oneFrame, "1" denotes that the corresponding subframe is allocated for MBSFN. The following mapping applies for FDD: The first/leftmost bit defines the MBSFN allocation for subframe #1, the second bit for #2, the third bit for #3, the fourth bit for #6, the fifth bit for #7, and the sixth bit for #8; for TDD: The first/leftmost bit defines the allocation for subframe #3, the second bit for #4, the third bit for #7, the fourth bit for #8, and the fifth bit for #9. Uplink subframes are not allocated. The last bit is not used.

As is indicated by the term "CHOICE" in the syntax above, only one of the fourFrames IE and fourFrames IE is used.

The IEs radioFrameAllocationPeriod and radioFrameAllocationOffset define in which frames the MBSFN subframes are scheduled. In particular, radio frames that contain MBSFN subframes occur when equation SFN modulo radioFrameAllocationPeriod=radioFrameAllocationOffset is satisfied. Value n1 for radioframeAllocationPeriod denotes value 1, n2 denotes value 2, and so on. When the IE fourFrames is used for subframeAllocation, the equation defines the first radio frame referred to in the description below. Values n1 and n2 are not applicable when fourFrames is used.

The IE subframeAllocation defines the subframes that are allocated for MBSFN within the radio frame allocation period defined by the radioFrameAllocationPeriod and the radioFrameAllocationOffset.

An exemplary configuration of MBSFN is illustrated in FIG. 6. In this exemplary configuration, each 8th radio frame is configured for MBSFN transmission, starting with the third frame corresponding to offset of two. The subframes are specified by the bitmap "110000" (6 bits corresponding to subframes #1, #2, #3, #6, #7, and #8 respectively) which specifies that subframes #1 and #2 in the configured frames (the 10 subframes in a frame are number from 0 to 9) are used for the MBSFN transmission.

The above described subframe configuration for multimedia broadcast in LTE may be received by the terminal and used to determine MBSFN subframes and to exclude the determined MBMS subframes from among subframes which are to be used for conveying the system information for MTC. Accordingly, the system information configuration information does not need to include bits corresponding to subframes configured for MB SFN, thus reducing the SI overhead.

However, it may be beneficial for some terminals not to read (decode) the MBSFN signaled in SIB2 for instance in order to reduce power consumption caused by receiving and the decoding of SIB2 of the legacy system in addition to receiving and decoding of the system information for the enhanced coverage system.

In order to enhance configurability of system information signaling, according to an embodiment, a subframe scheduling field application bit (abbreviated as "U-bit" meaning "universality bit") is provided. The U-bit indicates whether the subframe scheduling field is to be understood universally, i.e., without considering MBSFN subframe configuration or whether the subframes configured for MBSFN are to be excluded. For instance, if U-bit is set to TRUE (e.g., logical "1"), it means that the subframe scheduling field (bitmap) is a universal bitmap and is applicable irrespectively of the MB SFN configuration in the cell and therefore the UE (MTC device) does not need to acquire/use the MBSFN-SubframeConfig. On the other hand, if the U-bit is set to FALSE (e.g., logical "0"), it means that the subframe scheduling field (bitmap) is not a universal bitmap and the MTC device must also acquire the IE MBSFN-SubframeConfig in order to determine the position of subframes configured for MTC SI (EC SI) in order to avoid attempts to receive MTC SI on subframes that are not carrying MTC SI since they already carry MB SFN.

Accordingly, with one single bit it may be indicated whether the same configuration applies for SI transmission in frames configured as MBSFN subframes as well. In case the subframe scheduling field is universal, i.e., valid for any subframes also including multimedia broadcast, it is up to the network to ensure that no collision occurs, i.e., that the scheduling information is not scheduled to the same subframes as the multimedia broadcast. MTC device just assumes that all the subframes (irrespective of and with or without the knowledge of if the subframes belong to the frames carrying MBSFN subframes or not) indicated by the subframe scheduling field for the MTC SI carry the MTC SI.

In case the subframe scheduling field is not universal, i.e., it can be only correctly interpreted after reception of the multimedia broadcast configuration, it is to be ensured that the terminals receive both the multimedia broadcast configuration and the subframe scheduling field. In order to avoid increased battery consumption which would be caused by attempts to receive and decode system information carrying the multimedia broadcast configuration in the legacy system, the multimedia broadcast configuration may be included into the EC specific system information. For instance, the IE mbsfn-SubframeConfigList may be included into the MTC-specific SIB such as MTC SIB 1.

Accordingly, based on the U-bit value, the MTC device may exactly know where the MTC SI will be transmitted and therefore avoid unnecessary reception attempts, thereby saving battery.

For instance, when the value of the U-bit is FALSE, then the wireless device (such as MTC device) performs the following calculation to find out which subframes in frames carrying MBSFN subframes are carrying MTC SI. Let A be a bitmap corresponding to the subframe scheduling field for the MTC SI and B be an extended bitmap corresponding to MBSFN configuration as described above for LTE. It is noted that in this example the format of both bitmaps may cover either one or four frames as exemplified above for the MBSFN configuration. Accordingly, the bitmap A may be 10 or 40 bits long-describing subframes of one or 4 frames, respectively. Bitmap B may have the same format, which may be generated by taking the 6 or 24 bits as described above belonging to the MBSFN configuration and inserting "0" on the positions of corresponding subframes not included into the bitmap (i.e., corresponding to the non-MBSFN subframe positions). For instance, A=0101010101 and B=0110000000 in their extended format (inserting 0s at positions 0, 4, 5 and 9), covering all subframes of a single frame. In order to determine the location of the SI, logical AND is applied between the frames with SI configured and frames without MB SFN configured, corresponding to A AND (NOT(B)) which is for the above example (0101010101) AND (NOT (0110000000))=0101010101 AND 1001111111=0001010101.

Therefore, in normal frames the SI is carried in subframes #1, #3, #5, #7, #9 (i.e., bitmap A) and in MBSFN frames in subframes #3, #5, #7, #9 (A AND (NOT(B))).

A possible ASN structure for this embodiment may look as shown in the following:

Similarly to the MTSFN subframes signaling, the configuration for system information may be carried in system information within a container IE "MTCSISubframeConfig". As is clear to those skilled in the art, the name of this IE is only exemplary and any other name may be used instead. In this example, the IE MTCSI-SubframeConfig defines subframes that are reserved for MTC SI transmission in downlink on MTC specific bandwidth as follows:

```
-- ASN1START
MTCSI-SubframeConfig ::= SEQUENCE {
    radioframeAllocationPeriod   ENUMERATED {n1, n2, n4, n8, n16, n32},
    radioframeAllocationOffset   INTEGER (0..7),
    firstBitmapSolution1         BIT STRING (SIZE(10)),
    universalUse                 ENUMERATED {True, False},
    mbsfn-SubframeConfig         MBSFN-SubframeConfig OPTIONAL -- Cond universal
}
-- ASN1STOP
```

The MTCSI-SubframeConfig IE includes further IEs. The meaning of the IEs radioFrameAllocationPeriod and radioFrameAllocationOffset is the similar as for the corresponding, above described MBSFN IEs. In particular, the IEs radioFrameAllocationPeriod and radioFrameAllocationOffset define in which frames the SI subframes are scheduled.

IE firstBitmapSolution1 corresponds to the subframe scheduling information field described above and is a bitmap with 10 bits for respective 10 subframes of a frame. As described above, the bitmap may be shorter than the number of subframes in a frame.

IE universalUse corresponds to the above described U-bit and indicates whether or not the IE firstBitmapSolution1 applies continuously, i.e., for all subframes of the frames indicated by the allocation period and offset. The IE universalUse can take two Boolean values: True or False. If the IE universalUse has the value False, then the wireless device receiving the bitmap needs to determine (e.g., calculate by logical operations as described above) which subframes in the frames carrying also MBSFN subframes will carry the MTC SI. This is performed in this example by reading the following IE mbsfn-SubframeConfig which is described above and which indicates the configuration of the MBSFN frames including allocation period, offset and bitmap.

In other words, if the IE universalUse has the value False, then the IE mbsfn-SubframeConfig is present. If on the other hand the IE universalUse has the valueTrue, then the IE mbsfn-SubframeConfig may not be present.

The conditional presence set to "universal" in the ASN syntax above means that this field (IE mbsfn-SubframeConfig) is mandatory present when the field universalUse has the value False.

It is noted that this example shows the inclusion of the MBSFN configuration (scheduling) directly into the system information configuration information (corresponding to the IE MTCSI-SubframeConfig). However, the present disclosure is not limited by this example. The ASN syntax may include the U-bit (universalUse) and not include the MBSFN configuration. In such case, as described above, the MTC device may determine the MBSFN configuration by reading the corresponding system information (such as IE mbsfn-SubframeConfigList in SIB2 in the case of the LTE legacy system).

Including the MBSFN configuration into the system information configuration information has the advantage of not requiring the MTC device to monitor resources for SIB1 by using the RNTI-SI. On the other hand, including the MBSFN configuration into the system information configuration information requires additional signaling overhead.

Figure 7:
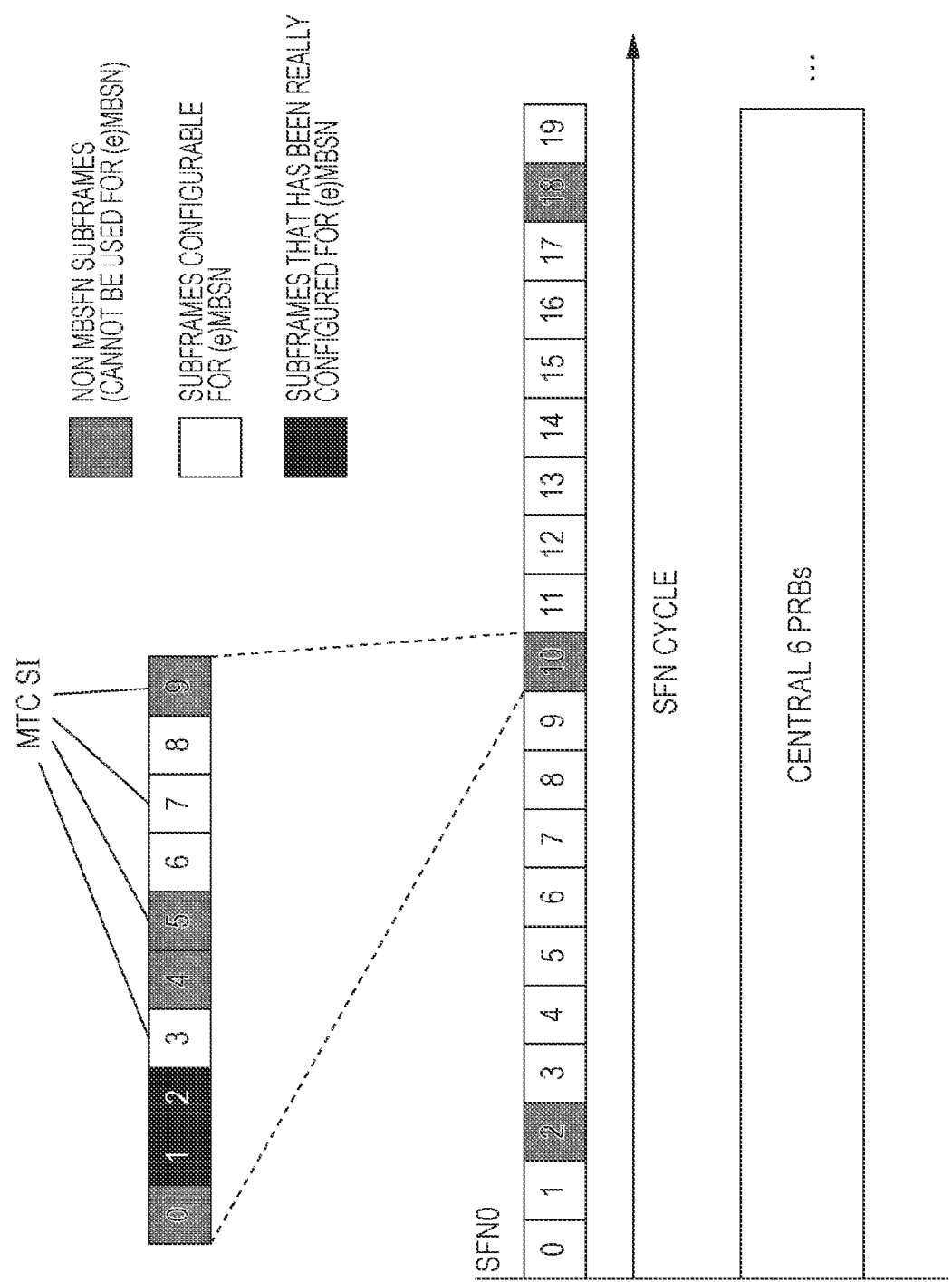
FIG. 7 is a schematic drawing illustrating configuration of system information transmission.

FIG. 7 shows frames carrying MBSFN subframes i.e., frames with sequence frame number (SFN) equal to 2, 10 and 18 (frame number and positions are derived from the IEs radioFrameAllocationPeriod and radioFrameAllocationOffset as described above). Further, the figure shows four types of subframes:
- Non MBSFN subframes (subframes with number 0, 4, 5 and 9 within the frame 10 in the figure) that cannot be used for eMBMS/MBMS/MBSFN purpose (i.e., for multimedia broadcast transmission),
- Subframes that may be configured for eMBMS/MBMS purpose/MBSFN (subframes with number 1, 2, 3, 6, 7 and 8),
- Subframes that are actually configured for eMBMS/MBMS/MBSFN purpose (1, 2) in this example, which is given by the oneFrame/fourFrame field as described above.
- Subframes that are configured for transmission of the MTC SI (subframes with numbers 3, 5, 7, and 9), which may be indicated in the SI configuration information as described above.

Also, the diagram shows as an example that the MTC SI(s) are scheduled in the central 6 PRBs per default so that no additional frequency scheduling is necessary. It is noted that FIG. 7 is a mere example of a configuration.

In accordance with another, second embodiment, two separate bitmaps with two different respective formats are provided within the SI configuration information, one for normal frames (frames not carrying MBSFN subframes) and another one for frames carrying MB SFN subframes. One of the advantages of this embodiment is that it is simpler for the terminal, since the UE does not need to receive the MBSFN information, perform some bitwise operation as exemplified above etc. It merely applies the configurations as they apply to different set of frames, i.e., to the frames/subframes corresponding to the two bitmap formats/configurations.

The MTC device does not need to know anything about the MBSFN configuration. It merely applies the format based on a configuration (e.g., format1 on even subframes and format2 on odd subframes) which is also signaled within the SI configuration.

In particular, the length of a normal-frame bitmap may be 10 bits (or 9 bits when assuming that subframe #0 is never used for MTC SI transmission) whereas the length of the bitmap for frames carrying MB SFN subframes (MTCSI-subframeAllocationbitmap) may be the same as the MBSFN scheduling described above. In the following, an example of such a bitmap is shown:

```
-- ASN1START
MTCSI-subframeAllocation    CHOICE {
    oneFrame                BIT STRING (SIZE(6)),
    fourFrames              BIT STRING (SIZE(24))
}
-- ASN1STOP
```

As a further optimization, a 'Q-bit' bit may indicate whether or not the corresponding bits in the first bitmap apply also to subframes #0, #4, #5, #9 (in FDD) and subframes #0, #1, #5, #6 (in TDD; either DL or special subframes) in frames pointed to by the information element including the second bitmap configuration. The above mentioned subframes #0, #4, #5, #9 (in FDD) and subframes #0, #1, #5, #6 (in TDD) are subframes which are never (i.e., in no frame) used to transmit MBSFN data.

The second solution always signals two separate bitmaps one for normal (non-MBSFN) frames and other for frames carrying MBSFN subframes. The second bitmap (for frames carrying MB SFN subframes) does not talk about subframes #0, #4, #5, #9 (in FDD) and subframes #0, #1, #5, #6 (in TDD). So, using the 1 bit information, the network can indicate whether or not the first bitmap applies also to these subframes of a frame carrying MBSFN subframes.

Alternatively, an interpretation may be defined for instance in a standard, according to which the UE has to assume that the corresponding bits in the first bitmap applies also to subframes #0, #4, #5, #9 (in FDD) and subframes #0, #1, #5, #6 (in TDD; either DL or Special subframes) in frames pointed by the second bitmap configuration.

An exemplary syntax for the SI configuration information is shown below. The configuration for system information according to this second embodiment may also be carried in system information within a container IE "MTCSI-SubframeConfig".

The IE MTCSI-SubframeConfig defines subframes that are reserved for MTC SI transmission in downlink on a MTC specific bandwidth.

```
-- ASN1START
MTCSI-SubframeConfig ::=        SEQUENCE {
    firstBitmap                     BIT STRING (SIZE(10)),
    secondBitmap                    SecondBitmap
}
SecondBitmap ::=                SEQUENCE {
    radioframeAllocationPeriod      ENUMERATED {n1, n2, n4, n8, n16, n32},
    radioframeAllocationOffset      INTEGER (0..7),
    subframeAllocation              CHOICE {
        oneFrame                        BIT STRING (SIZE(6)),
        fourFrames                      BIT STRING (SIZE(24))
    }
}
-- ASN1STOP
```

The SI configuration above includes a first bitmap field "firstBitmap" which has a length of 10 bits. It is noted that this is only an exemplary length of the bitmap corresponding to the number of subframes per frame. However, as described above, some subframes may be left out as well as the corresponding bitmap bits and thus the first bitmap may be shorter than the number of subframes per frame. The information element firstBitmap is applied to frames to which secondBitmap is not applicable.

The second bitmap is included in an IE secondBitmap which includes not only the bitmap itself (subframe scheduling field) but also further configuration information —in this example it is the allocation period and offset. The IE secondBitmap thus tells exactly on which frames and subframes SI MTC will be provided. Interpretation of individual fields (radioframeAllocationPeriod, radioframeAllocationOffset, oneFrame and fourFrames) is the same as in the MBSFN-SubframeConfig described in the above first embodiment.

In the above example, the configuration of the secondBitmap includes a bitmap (in the field oneFrame or in the field fourFrames) which is shorter (in terms of a number of bits) than the first bitmap if the length of 6 bits is taken. In particular, the bitmap in the secondBitmap IE follows the lengths of the MBSFN configuration IEs, i.e., 6 and 24 subframes. However, the length of the second bitmap may also be 24 bits.

Accordingly, in the above example, the second bitmap does not address some subframes preknown to the UE e.g., subframes 0, 4, 5, 9 (for FDD) which cannot carry MBSFN frames. However, it is noted that the present disclosure is not limited to such configuration. The second bitmap may also address these frames and not address others (for instance frame 0 because of MIB signaling or other examples mentioned in connection with the first embodiment).

As described above, a Q-bit may also be part of the SI configuration information as is exemplified in the following ASN syntax.

```
-- ASN1START
MTCSI-SubframeConfig ::=        SEQUENCE {
    firstBitmap                     BIT STRING (SIZE(10)),
    secondBitmap                    SecondBitmap,
    q-Bit                           ENUMERATED {True, False}
}
SecondBitmap ::=                SEQUENCE {
    radioframeAllocationPeriod      ENUMERATED {n1, n2, n4, n8, n16, n32},
    radioframeAllocationOffset      INTEGER (0..7),
    subframeAllocation              CHOICE {
        oneFrame                        BIT STRING (SIZE(6)),
        fourFrames                      BIT STRING (SIZE(24))
    }
}
-- ASN1STOP
```

The Q-Bit indicates whether or not the bits in the first-Bitmap (#0, #4, #5, #9 in FDD and subframes #0, #1, #5, #6 in TDD) apply also to the corresponding subframe position of the secondBitmap. Accordingly, with the Q-bit set to True, the subframes not addressed by the second bitmap's bits may still be used for transmission of SI.

Similarly as U-bit, the IE q-bit can take two Boolean values: True or False. If the IE q-bit has the value False, then the first bitmap is only applicable to the frames not indicated in the second configuration carried in the IE secondBitmap. These may advantageously be the non-MBSFN frames. If, on the other hand, the IE q-bit has the value True, the first bitmap is also applicable to subframes not associated with any bits in the second bitmap (carried in oneFrame or fourFrames fields of the IE secondBitmap) which subframe positions (from 0-9) are being referred in by the secondBitmap may be specified and could, as an example, correspond to non-MBSFN subframes (i.e., subframes #0, #4, #5, #9 (in FDD) and subframes #0, #1, #5, #6 (in TDD)).

Thus, if the Q-bit is set to True, then a user device may determine the subframes carrying system information by applying logical OR between the second bitmap and the first bitmap as is illustrated in the following example: Assume the first bitmap (C) being 0001010110 and the second bitmap (D) being 010101. Then a bitmap C' is obtained by setting all positions of C except for the positions 0, 4, 5, 9 (positions not covered by the second bitmap) to zero resulting in C'=0001000010. The second bitmap D is extended to cover the number of subframes in the frame (here 10) by inserting "0" on the positions (0, 4, 5, 9) not covered by the second bitmap. This results in the second bitmap D' being 0010001001. Then a logical (bitwise) OR (non-exclusive) is performed between C' and D' resulting in 0001000010 OR 0010001001=0001001011 which means that the SI information is transmitted in the subframes with number 3, 6, 8 and 9 on the frames indicated by the secondBitmap; and on all other frames on subframes with number 3, 5, 7 and 8.

It is noted that the meaning of True and False may also be reversed. Moreover, it is noted that the bitmap D may also have a length of 24 bits as exemplified in the syntax above. In such case the bitmap D' is formed by inserting the zeros in positions of subframes 0, 4, 5, and 9 in each of the 4 frames represented by the 24-bit bitmap, obtaining in this way 40 bits. The 10-bit long second bitmap C would be repeated four times, resulting also in 40 bits. Then, similarly as described above, bitmap C' would be formed, also maintaining a length of 40 bits.

The above syntax and bitmap lengths are exemplary. As also already described above, any other lengths may be selected, depending on the number of subframes per frame and the number of subframes which have no assigned corresponding bit in the bitmap.

The present disclosure may provide several advantageous effects especially when applied to MTC SIB signaling in addition to a co-existing legacy system SIB signaling. In comparison with the current LTE SIB signaling, the present disclosure avoids introducing huge system load due to repetitions on a channel which has to be decoded blindly. The use of the channels on which blind decoding is to be applied such as (e)PDCCH/MPDCCH is avoided i.e., no dynamic scheduling for SI transmission is required. Moreover, legacy UEs are not affected so that they can still operate without any modifications. On the other hand, with the present disclosure, provisioning of static scheduling information in specification is not required.

In the present disclosure, an MTC device behavior is designed which exactly knows how the semi static scheduling information is to be used in MBSFN and normal frames/subframes. Among other advantages, this enables reducing the UE power consumption by restricting the UE acquiring SIs only in subframes that really carry the said SI.

In the above examples, the system information configuration information specified the location of the resources on which the SI is to be transmitted unambiguously. This means that the wireless devices do not need to attempt blind decoding in order to read the system information but rather know exactly, where and when to read it. Accordingly, if the above disclosure is applied for MTC SI signaling, the MTC devices may save battery by not trying blind decoding and thus no special RNTI for the MTC SI is necessary either.

However, in general, the position of the system information does not have to be precisely specified. In order to limit the power consumption, the opportunities for blind decoding may be merely reduced rather than fully specifying the position for reading/decoding the resources.

In particular, there may be predefined rules according to which the system information is not mapped on the resources (subframes):
- onto which physical broadcast channel is mapped, for instance the MIB and/or MTC-SIB1; and/or
- configured for multimedia broadcast (such as MBSFN, i.e., subframes in frames carrying MBSFN subframes); and/or
- scheduled for legacy SI transmission (using SI-RNTI, i.e., blind decoding).

In other words, the network schedules (MTC) system information similarly to the legacy system, i.e., dynamically using a separate identifier MTC-RNTI. The MTC terminals that attempt blind decoding by attempting to detect occurrence of the MTCRNTI in the (e)PDCCH or the equivalent channel for MTC monitored resources (basically CRC of (e)PDCCH/MPDCCH masked with MTC-RNTI) and upon detection of the MTC-RNTI read the MTC SI on that resources. In accordance with the above example, the terminals may reduce the number of monitored resources by excluding any of MTC-SIB1 subframes, legacy SI subframes, MBSFN subframes or the like.

Another issue concerning the attempts to decode such unnecessary trying complicates how it counts 'max number of failed soft combining attempts. This is required in order to not erroneously count/conclude that the maximum number of failed soft combining attempts have been exceeded. This determination of exceeding the maximum number is used to notify higher layers that the system information could not be acquired.

MTC SI, similarly to the MTC data are to be transmitted with a large amount of repetitions in order to extend the coverage for the MTC system by ensuring correct reception even in bad channel conditions as explained in the background section.

The repetitions are not necessarily repetitions of the same coded blocks. Rather, the data before encoding is the same, but the repetitions generally represent possibly different encodings of the same data (i.e., different redundancy versions for HARQ retransmissions). This means that the repetitions may belong to other redundancy versions. The receiver then tries to combine received data gained by repetitions and decode it. The more repetitions are received, the higher is the probability of correct decoding. After a predetermined number of decoding attempts, the reception is considered as failed and the higher layers are notified as is done in MAC sublayer upon exceeding Maximum HARQ retransmissions described in section 5.4.2.2 of 3GPP TS 36.321, v12.5.0, "Evolved Universal Terrestrial Radio Access (E-UTRA); Medium Access Control (MAC) protocol specification" available at www.3gpp.org.

If the system information is scheduled semi-statically and unambiguously as described in the above disclosure, the terminal has the accurate information concerning the location and number of repetitions of the system information repetitions scheduled. The number of repetitions could be specified or configured in system information. UE knows from the scheduling info which SIs is/are being transmitted within which SI-windows. UE knows from the MTC Scheduling info how often the SI-window for SIX will come, how long is the SI-Window etc. Thus, the terminal is capable of correctly determining when the predetermined number of decoding attempts failed. However, in the case of blind decoding, the terminal may count some SI reception attempts (when MTC SI was not even being transmitted) and thus, count the decoding attempts incorrectly. If not counted correctly, the UE may prematurely quit to acquire the said system information and thus fail to avail the service(s) of the network which could include also camping/selecting a cell.

Figure 2:
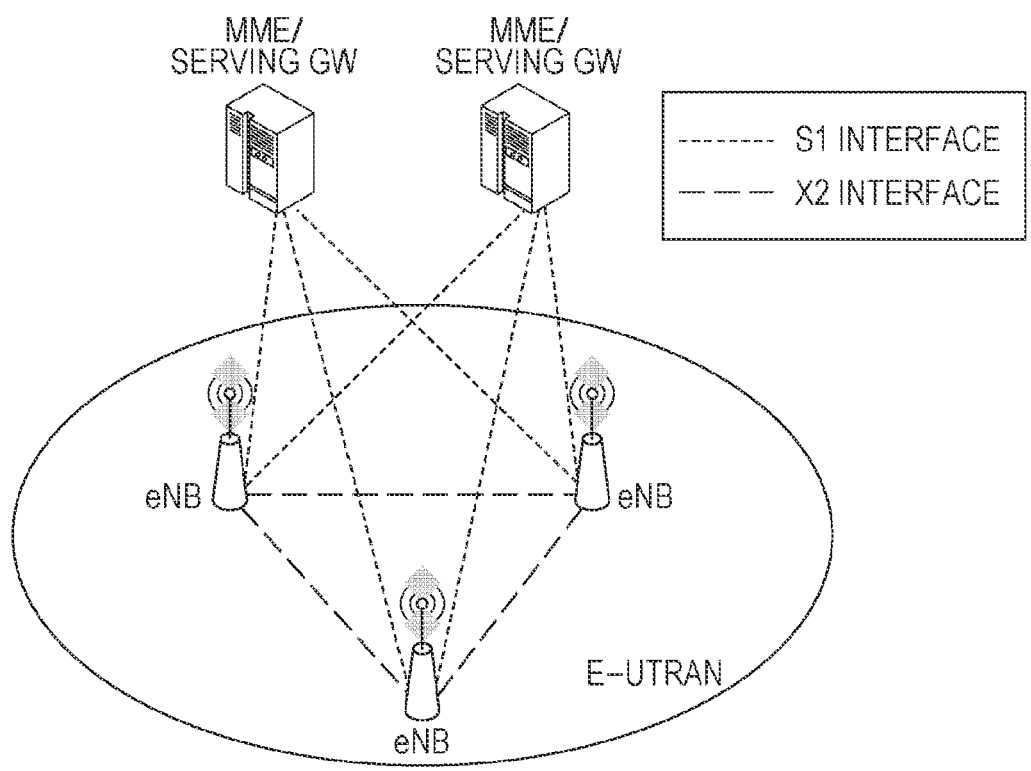
FIG. 2 is a block diagram illustrating an exemplary architecture of a radio access network in 3GPP LTE.
Figure 3:
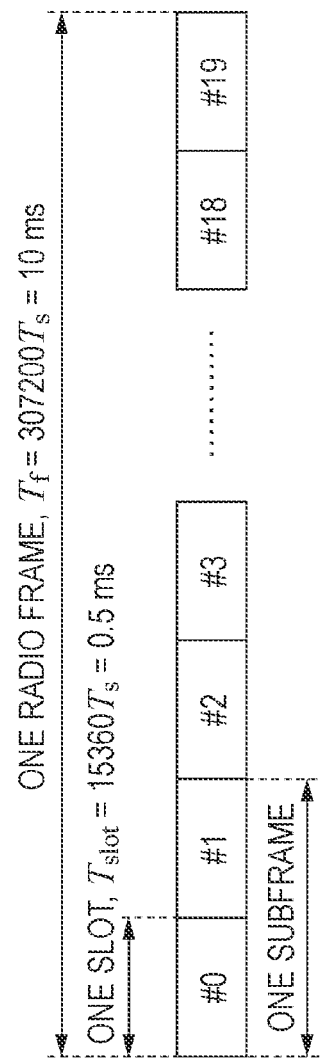
FIG. 3 is a schematic drawing showing the general structure of a frame in 3GPP LTE FDD.
Figure 4:
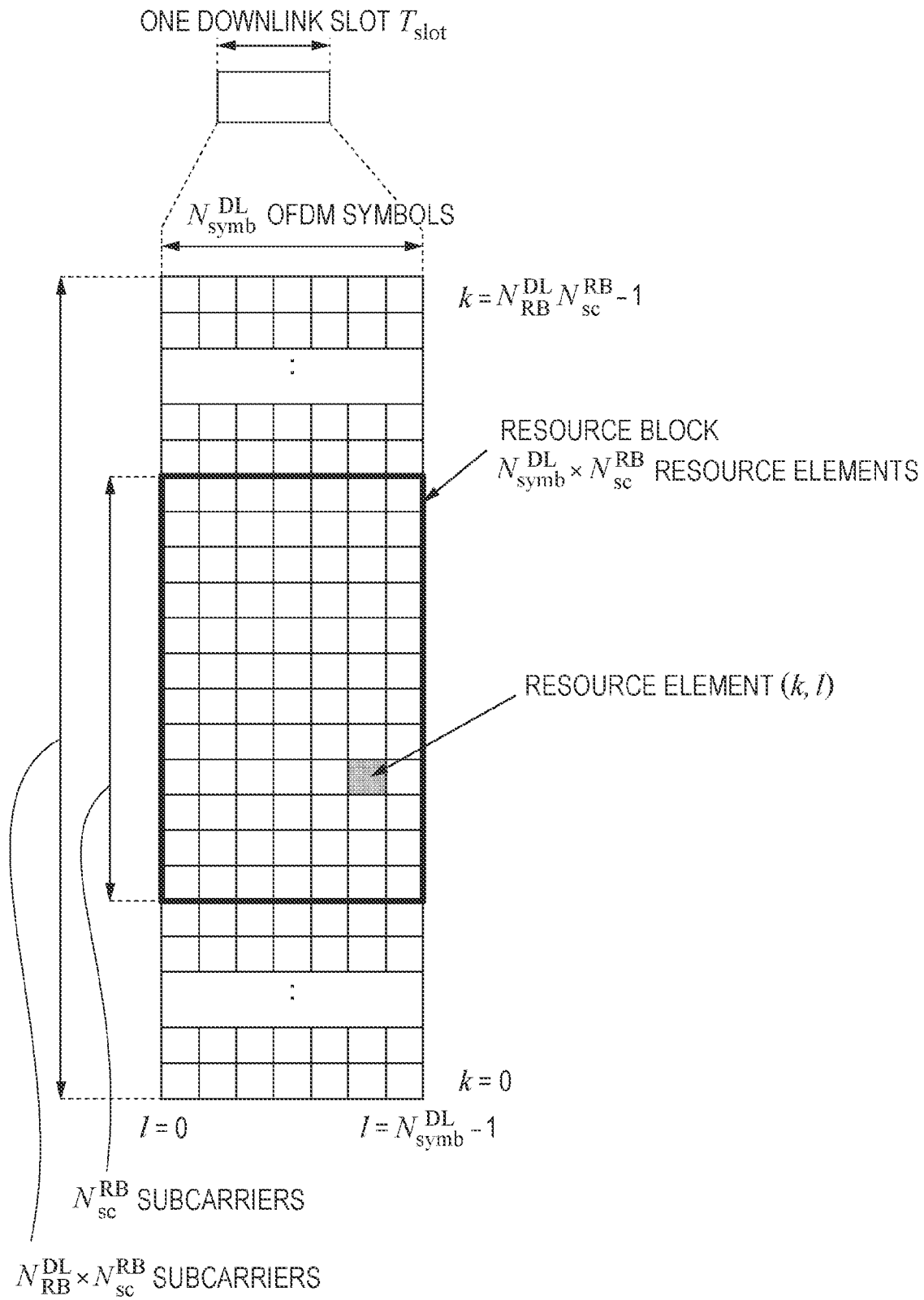
FIG. 4 is a schematic drawing showing the general structure of a sub-frame on a downlink component carrier defined for 3GPP LTE.
Figure 8:
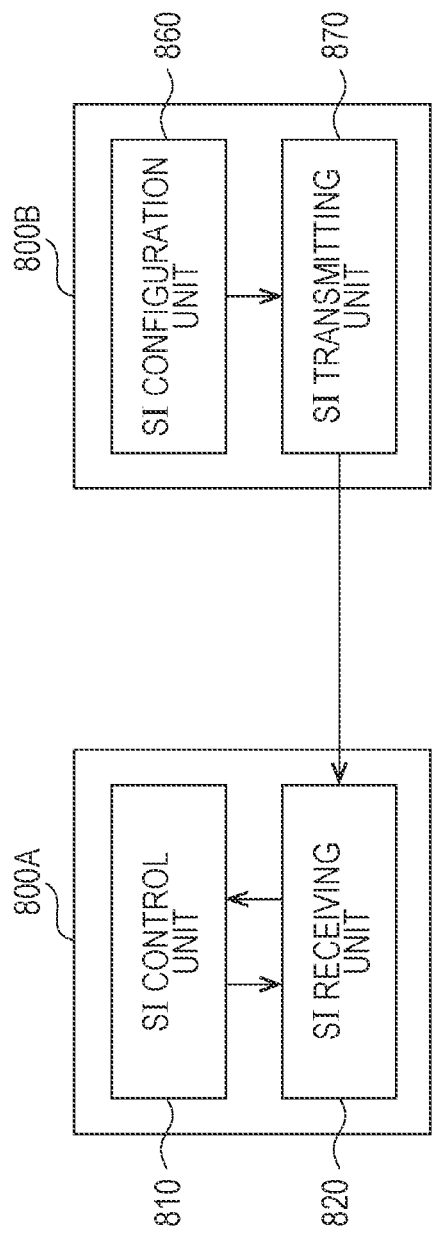
FIG. 8 is a block diagram illustrating a receiving apparatus and a transmitting apparatus.

In other words, the present disclosure provides an apparatus for receiving system information illustrated in FIG. 8 and operable in a wireless communication system such as the one illustrated in FIGS. 1 and 2. The apparatus (receiver, wireless device as illustrated also in FIG. 2) 800A comprises: a receiving unit 820 for receiving system information configuration information and for receiving system information in predetermined subframes of a radio interface; and a control unit 810 for determining the predetermined subframes according to the received system information configuration information and for controlling the receiving unit 820 to receive the system information in the predetermined subframes, wherein the system information configuration information includes a subframe scheduling field with a plurality of bits, each bit being associated with a subframe and representing whether or not system information is to be received in that subframe.

In particular, the wireless device 800A may be a mobile terminal in a cellular system such as LTE or LTE-A, in which system information is transmitted by means of the RRC protocol messages. The receiving unit 820 receives the SI configuration and passes it to the control unit 810 which then controls the receiving unit 820 to receive the system information according to that configuration. Receiving here means physically receiving the wireless signal and decoding the information transmitted.

The present disclosure also provides an apparatus 800B for transmitting the system information in the wireless communication system. The apparatus 800B may be a network node such as a base station or more specifically an (e)NB in the LTE system. The network node 800B comprises a configuration unit 860 for configuring subframes to carry or not to carry system information, to generate a system information configuration information indicating the configuration, and for controlling a transmitting unit 870 to transmit the system information in the configured subframes, wherein the transmitting unit 870 serves for transmitting system information configuration information and for transmitting system information in the configured subframes of a radio interface; wherein the system information configuration information includes a subframe scheduling field with a plurality of bits, each bit being associated with a subframe and representing whether or not system information is to be received in that subframe.

The network node 800B configures the transmission of the system information according to the type of the cell and the features supported by the cell as is also the case for the system information transmitted in the 3GPP LTE or LTE-A or UMTS or any other known system. The features of the cell may include support for MTC—either of or both low complexity (LC) and coverage enhancement (EC) and the system information related to these features.

Advantageously, the number of bits of the system information configuration information associated with respective subframes is less than or equal to the number of subframes in a radio frame; none of the bits is associated with at least one of:
  subframes used for reception of system information configuration information,
  subframes used for a physical broadcast channel, subframes configured for multimedia broadcast operation; and the system information is transmitted by the network node 800B (and correspondingly also received by the wireless device 800A) only on subframes indicated by the bits in the subframe scheduling field of the system information configuration information.

For instance, the system information configuration information is transmitted (from the network node 800B) and received (by the wireless device 800A) either within a master information message of a radio resource control protocol carried on a physical broadcast channel or within a system information message of the radio resource control protocol scheduled in the master information message, and the system information configuration information further comprises an indication of the frequency resources for the system information including at least one of a location and/or number of physical resource blocks reserved for the system information, and/or whether or not frequency hopping is applied.

The apparatus 800A (wireless device) may be a machine type communication, MTC, terminal and said system information may be system information for MTC. Advantageously, none of the bits in the subframe scheduling field is associated with subframes carrying system information for other type of communication.

For example, the system information configuration information further comprises a subframe scheduling field application indicator for indicating whether or not a multimedia broadcast scheduling information is to be used; the control unit 810 of the receiver is configured, when the subframe scheduling field application indicator has a first value, to
  receive the multimedia broadcast scheduling information indicating subframes used for multimedia broadcast communication;
  determine the predetermined subframes in accordance with the multimedia broadcast scheduling information by excluding the subframes used for multimedia broadcast communication; and
  not to receive or take into account the multimedia broadcast scheduling information when the subframe scheduling field application indicator has another value different from the first value.

Correspondingly, the configuration unit 860 is configured to set the subframe scheduling field application indicator and the corresponding SI configuration information accordingly.

The multimedia broadcast scheduling information may include a subframe scheduling field with a plurality of bits, each bit being associated with a subframe and representing whether or not multimedia broadcast is to be transmitted in that subframe.

The control unit 810 of the wireless device is then advantageously configured to determine the predetermined subframes by applying a logical AND between bits of a bitmap representing the subframes in which the system information is to be received and the subframes in which the multimedia broadcast is not transmitted.

Alternatively, the system information configuration information includes:

a first subframe scheduling field and a second subframe scheduling filed of which each includes subfields for some respective subframes; and scheduling information indicating to which frames the second subframe scheduling field applies, the second subframe scheduling field is applied to the frames indicated by the scheduling information whereas the first subframe scheduling field is applied to any other frames.

For example, the second subframe scheduling field has no bits associated with some predefined subframes; and the system information configuration information includes a first bitmap application bit for indicating whether or not the bits of first subframe scheduling field associated with said predefined frames are to be applicable for the frames indicated in the scheduling information.

For any of the above described examples, a master information message transmitted on a physical broadcast channel may include scheduling information concerning subframe scheduling of a first system information which includes the system information configuration information, and none of the bits of the subframe scheduling field is associated with subframes indicated as carrying the first system information in said scheduling information.

The scheduling information may consist of a predefined number of predefined combinations of at least two of: first system information size, subframes in which the first system information can be scheduled, application of frequency hopping, frequency hopping pattern and frequency allocation.

Further features as described above in detail may be featured by the wireless device, network node and the system information configuration information format.

Figure 9:
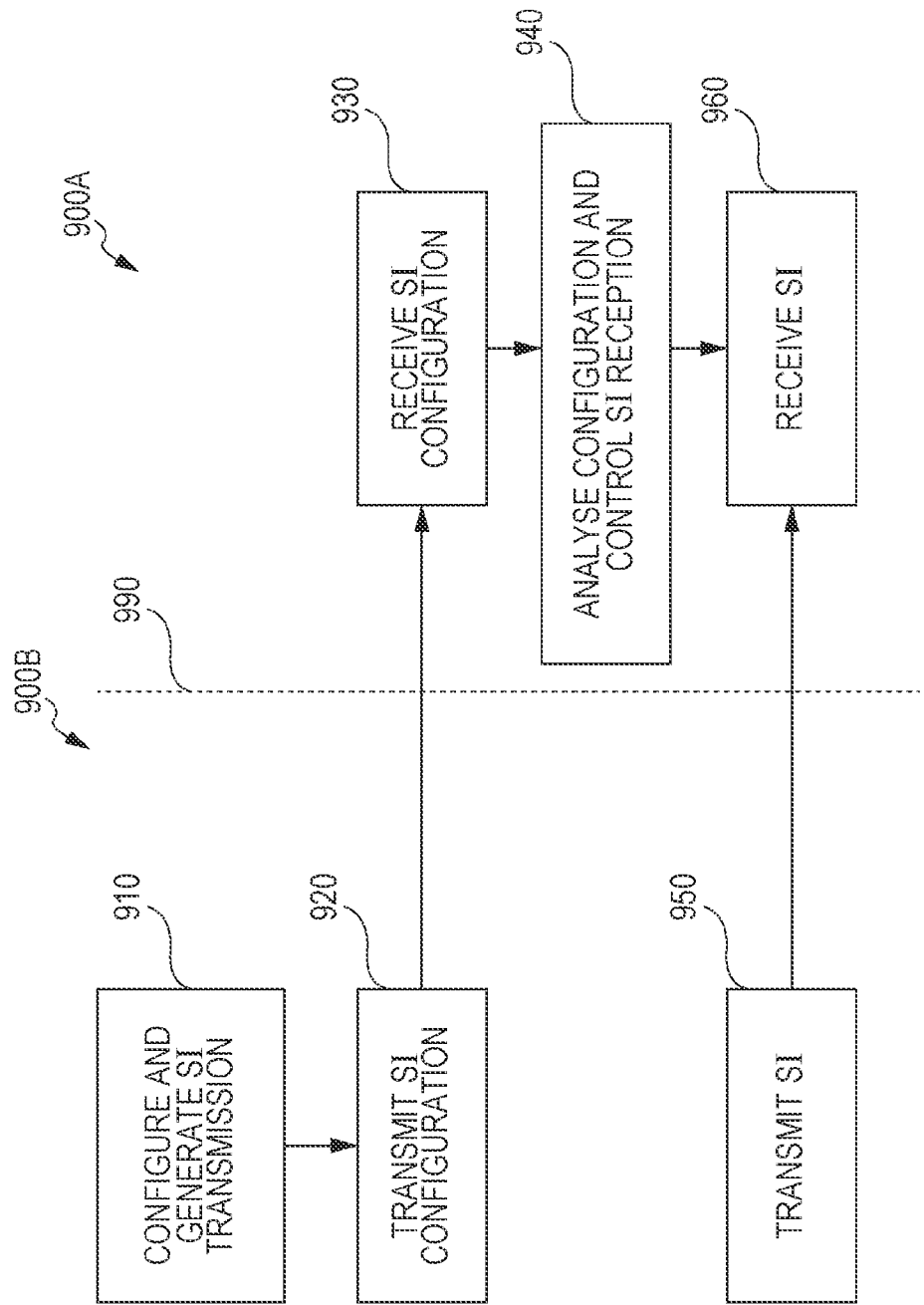
FIG. 9 is a flow diagram illustrating a receiving and transmitting method.

The present disclosure further provides a method 900A for receiving system information in a wireless communication system (the interface formed by the wireless channel is illustrated by the vertical dashed line 990) as illustrated in FIG. 9. The receiving method 900A includes the steps of receiving system information configuration information 930 and receiving system information 960 in predetermined subframes of a radio interface; and determining 940 the predetermined subframes according to the received system information configuration information and controlling 940 the receiving of the system information to take place in the predetermined subframes, wherein the system information configuration information includes a subframe scheduling field with a plurality of bits, each bit being associated with a subframe and representing whether or not system information is to be received in that subframe.

The present disclosure also provides a method 900B for transmitting the system information in the wireless communication system comprising the steps of configuring 910 subframes to carry or not to carry system information and to generate a system information configuration information indicating the configuration as well and controlling the transmitting unit to transmit the system information in the configured subframes, and further comprising the steps of transmitting 920 the system information configuration information and transmitting 950 the system information in the configured subframes of a radio interface, wherein the system information configuration information includes a subframe scheduling field with a plurality of bits, each bit being associated with a subframe and representing whether or not system information is to be received in that subframe.

In another general aspect, the techniques disclosed here feature an apparatus for transmitting system information in a wireless communication system comprising: a configuration unit for configuring subframes to carry or not to carry system information, to generate a system information configuration information indicating the configuration, and for controlling the transmitting unit to transmit the system information in the configured subframes, wherein a transmitting unit for transmitting system information configuration information and for transmitting system information in the configured subframes of a radio interface; wherein the system information configuration information includes a subframe scheduling field with a plurality of bits, each bit being associated with a subframe and representing whether or not system information is to be received in that subframe.

In another general aspect, the techniques disclosed here feature a method for receiving system information in a wireless communication system comprising: receiving system information configuration information and for receiving system information in predetermined subframes of a radio interface; and determining the predetermined subframes according to the received system information configuration information and for controlling the receiving of the system information to take place in the predetermined subframes, wherein the system information configuration information includes a subframe scheduling field with a plurality of bits, each bit being associated with a subframe and representing whether or not system information is to be received in that subframe.

In one general aspect, the techniques disclosed here feature a method for transmitting system information in a wireless communication system comprising: configuring subframes to carry or not to carry system information, to generate a system information configuration information indicating the configuration, and for controlling the transmitting unit to transmit the system information in the configured subframes, wherein transmitting system information configuration information and for transmitting system information in the configured subframes of a radio interface; wherein the system information configuration information includes a subframe scheduling field with a plurality of bits, each bit being associated with a subframe and representing whether or not system information is to be received in that subframe.

In accordance with another embodiment, a computer program product comprising a computer-readable medium having a computer-readable program code embodied thereon is provided, the program code being adapted to carry out the present disclosure.

Other exemplary embodiments relate to the implementation of the above described various embodiments using hardware and software. In this connection a user terminal (mobile terminal) and an eNodeB (base station) are provided. The user terminal and base station are adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. They may include a data input and output coupled thereto. The various embodiments may also be performed or embodied by a combination of these devices.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The invention claimed is:

1. An integrated circuit for controlling a transmitting apparatus, the integrated circuit comprising:
    control circuitry which, in operation, generates system information configuration information; and
    transmitting circuitry, which is coupled to the control circuitry and which, in operation,
        transmits the system information configuration information to a receiving apparatus, the system information configuration information defining first subframes, and
        transmits system information to the receiving apparatus in the first subframes;
    wherein,
    the system information configuration information indicates whether multimedia broadcast scheduling information is used to indicate second subframes for use in multimedia broadcast communication;
    when the multimedia broadcast scheduling information is used to indicate the second subframes for use in multimedia broadcast communication, the first subframes are defined exclusive of the second subframes; and
    when the multimedia broadcast scheduling information is not used, the first subframes are defined according to a subframe scheduling field of the system information configuration information, wherein each one of bits in the subframe scheduling field indicates whether a corresponding subframe is one of the first subframes.

2. The integrated circuit according to claim 1, wherein
    a number of the bits in the subframe scheduling field is less than or equal to a number of the subframes in a radio frame;
    none of the bits is associated with a subframe used for transmission of the system information configuration information, a subframe used for a physical broadcast channel, or a subframe configured for the multimedia broadcast communication; and
    the system information is transmitted only in subframes indicated by the bits in the subframe scheduling field as the first subframes.

3. The integrated circuit according to claim 1, wherein
    the system information configuration information is transmitted either within a master information message of a radio resource control protocol carried on a physical broadcast channel or within a system information message of the radio resource control protocol scheduled in the master information message, and
    the system information configuration information further comprises an indication of frequency resources for the system information including at least one of: (i) at least one of a location and a number of physical resource blocks reserved for the system information, and (ii) whether frequency hopping is applied.

4. The integrated circuit according to claim 1, wherein
    the receiving apparatus is a machine type communication (MTC) terminal;
    the system information is MTC system information; and
    none of the bits in the subframe scheduling field is associated with a subframe carrying system information for another type of communication.

5. The integrated circuit according to claim 1, wherein
    the system information configuration information includes:
        a first subframe scheduling field and a second subframe scheduling field, each including subfields for respective subframes; and
        scheduling information indicating to which frames the second subframe scheduling field applies, and
    the second subframe scheduling field is applied to the frames indicated by the scheduling information whereas the first subframe scheduling field is applied to any other frames.

6. The integrated circuit according to claim 5, wherein
    the second subframe scheduling field has no bits associated with any predefined subframes, and
    the system information configuration information includes a first bitmap application bit indicating whether the bits in the first subframe scheduling field are applicable to the frames indicated in the scheduling information.

7. The integrated circuit according to claim 1, wherein
    the transmitting circuitry, in operation, transmits a master information message on a physical broadcast channel, the master information message including scheduling information concerning first system information which includes the system information configuration information, and
    none of the bits in the subframe scheduling field is associated with a subframe carrying the first system information.

8. The integrated circuit according to claim 7, wherein the scheduling information consists of a predefined number of predefined combinations of at least two of: first system information size, subframes in which the first system information can be scheduled, application of frequency hopping, frequency hopping pattern, and frequency allocation.

9. The integrated circuit according to claim 1, wherein the bits in the subframe scheduling field are 10 or 40 bits long.

* * * * *